(12) United States Patent
Durrani et al.

(10) Patent No.: US 6,290,281 B1
(45) Date of Patent: Sep. 18, 2001

(54) POWER LATCH FOR AN AUTOMOTIVE VEHICLE CONVERTIBLE ROOF SYSTEM

(75) Inventors: Sheryar Durrani, West Bloomfield; Dennis E. Martin, Troy; Richard L. Matsu, Plymouth, all of MI (US)

(73) Assignee: ASC Incorporated, Southgate, MI (US)

( * ) Notice: Subject to any disclaimer, the term of this patent is extended or adjusted under 35 U.S.C. 154(b) by 0 days.

(21) Appl. No.: 09/320,032

(22) Filed: May 26, 1999

(51) Int. Cl.$^7$ ....................................................... B60J 7/185
(52) U.S. Cl. ............... 296/121; 292/341.16; 292/341.17; 292/229; 292/DIG. 5
(58) Field of Search ..................................... 296/121, 117; 292/51, 199, 341.15–341.17, 229, DIG. 5; 70/265

(56) References Cited

U.S. PATENT DOCUMENTS

| Re. 24,375 | 4/1957 | Thompson, III . |
|---|---|---|
| 1,174,366 | 3/1916 | Van Den Plas . |
| 2,201,330 | 5/1940 | Wernig et al. . |

(List continued on next page.)

FOREIGN PATENT DOCUMENTS

| 805 229 | 5/1951 | (DE) . |
|---|---|---|
| 1 505 721 | 7/1970 | (DE) . |
| 0 188 774 | 12/1985 | (EP) . |
| 352786 | 7/1931 | (GB) . |
| 536578 | 5/1941 | (GB) . |

OTHER PUBLICATIONS

Drawings of 1995 M.Y. Mitsubishi 3000GT Spyder retractable hard–top latching system (believed to have been offered for sale in 1994).

Drawing of latch assembly used in a convertible roof for a Geo Tracker (believed to have been offered for sale on or before 1992).

Primary Examiner—Dennis H. Pedder
(74) Attorney, Agent, or Firm—Harness, Dickey & Pierce, P.L.C.

(57) ABSTRACT

A power latch system is employed for securing a convertible roof to an automotive vehicle body. In another aspect of the present invention, a striker is movably mounted to either a forward or rearward portion of a convertible roof which is operably engaged by an automatically powered latch mounted to the vehicle body. Still another aspect of the present invention employs a rotatable latch having a striker engaging slot internally projecting from a periphery.

27 Claims, 5 Drawing Sheets

U.S. PATENT DOCUMENTS

| | | |
|---|---|---|
| 2,360,524 | 10/1944 | Simpson . |
| 2,486,905 | 11/1949 | Ackermans . |
| 2,560,459 | 7/1951 | Lundberg et al. . |
| 2,570,260 | 10/1951 | Milhan . |
| 2,570,261 | 10/1951 | Milhan . |
| 2,586,648 | 2/1952 | Hale et al. . |
| 2,674,480 | 4/1954 | Vigmostad . |
| 2,709,621 | 5/1955 | Votypka et al. . |
| 2,753,202 | 7/1956 | Smith et al. . |
| 2,785,914 | 3/1957 | Thomas et al. . |
| 2,831,718 | 4/1958 | Hallek et al. . |
| 2,852,292 | 9/1958 | Galla . |
| 2,879,988 | 3/1959 | Klisch . |
| 2,916,327 | 12/1959 | Gilson . |
| 3,004,788 | 10/1961 | Dully et al. . |
| 3,089,719 | 5/1963 | Csizmansky . |
| 3,353,864 | 11/1967 | Antaya et al. . |
| 3,362,740 | 1/1968 | Burns . |
| 3,425,742 | 2/1969 | Rauber, Jr. . |
| 3,443,834 | 5/1969 | Andres . |
| 3,891,252 | 6/1975 | Lehmann . |
| 4,537,440 | 8/1985 | Brockway et al. . |
| 4,618,180 | 10/1986 | Muscat . |
| 4,664,436 | 5/1987 | Eyb . |
| 4,702,505 | 10/1987 | Alexander . |
| 4,720,133 | 1/1988 | Alexander et al. . |
| 4,746,163 | 5/1988 | Muscat . |
| 4,801,173 | 1/1989 | Trenkler . |
| 4,815,775 | 3/1989 | Mertinet et al. . |
| 4,817,999 | 4/1989 | Drew . |
| 4,819,983 | 4/1989 | Alexander et al. . |
| 4,830,425 | 5/1989 | Muscat . |
| 4,830,426 | 5/1989 | Schlachter et al. . |
| 5,033,789 | 7/1991 | Hayashi et al. . |
| 5,042,869 | 8/1991 | Brin . |
| 5,046,767 | 9/1991 | Muscat . |
| 5,058,939 | 10/1991 | Miilu . |
| 5,064,241 | 11/1991 | Ohrle . |
| 5,067,768 | 11/1991 | Fischbach . |
| 5,085,483 | 2/1992 | Alexander . |
| 5,088,777 | 2/1992 | Ono et al. . |
| 5,154,479 | 10/1992 | Sautter, Jr. . |
| 5,186,516 | 2/1993 | Alexander et al. . |
| 5,269,586 | 12/1993 | Hahn et al. . |
| 5,301,987 | 4/1994 | Tokarz et al. . |
| 5,582,454 * | 12/1996 | Grover ........................... 296/107.09 |
| 5,595,407 * | 1/1997 | Ter Horst et al. .............. 292/341.16 |
| 5,624,149 | 4/1997 | Tokarz . |
| 5,678,881 | 10/1997 | Tokarz . |
| 5,775,767 | 7/1998 | Harrison et al. . |
| 6,036,241 * | 3/2000 | Ostdiek et al. ...................... 292/229 |
| 6,042,174 * | 3/2000 | Durrani ................................ 296/121 |
| 6,095,589 | 8/2000 | Kinnanen et al. .............. 196/107.09 |

\* cited by examiner

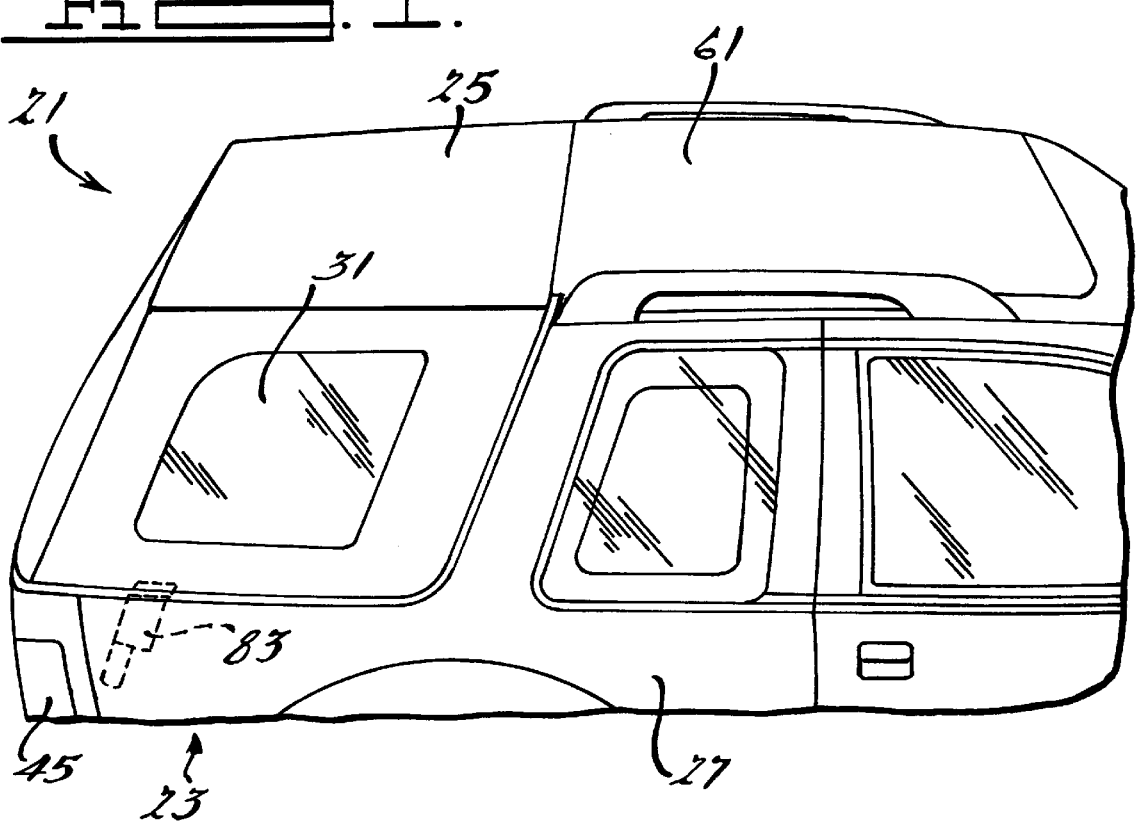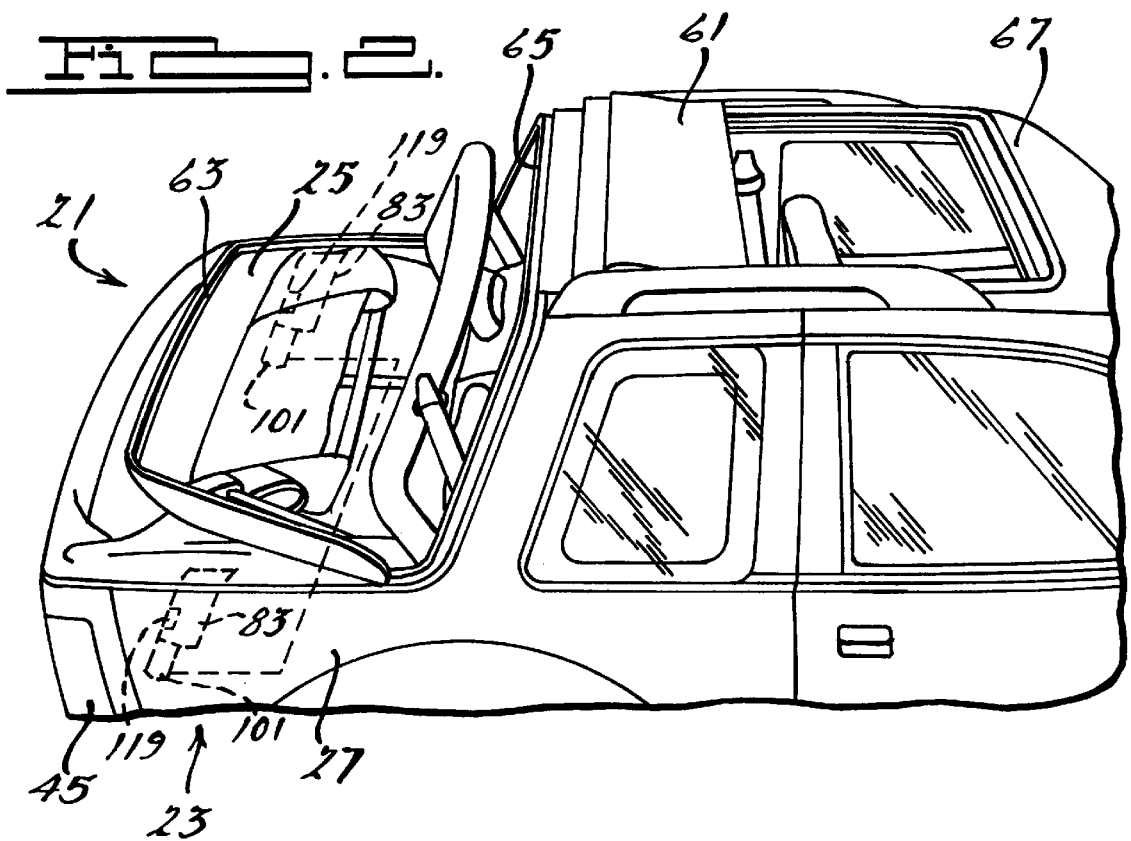

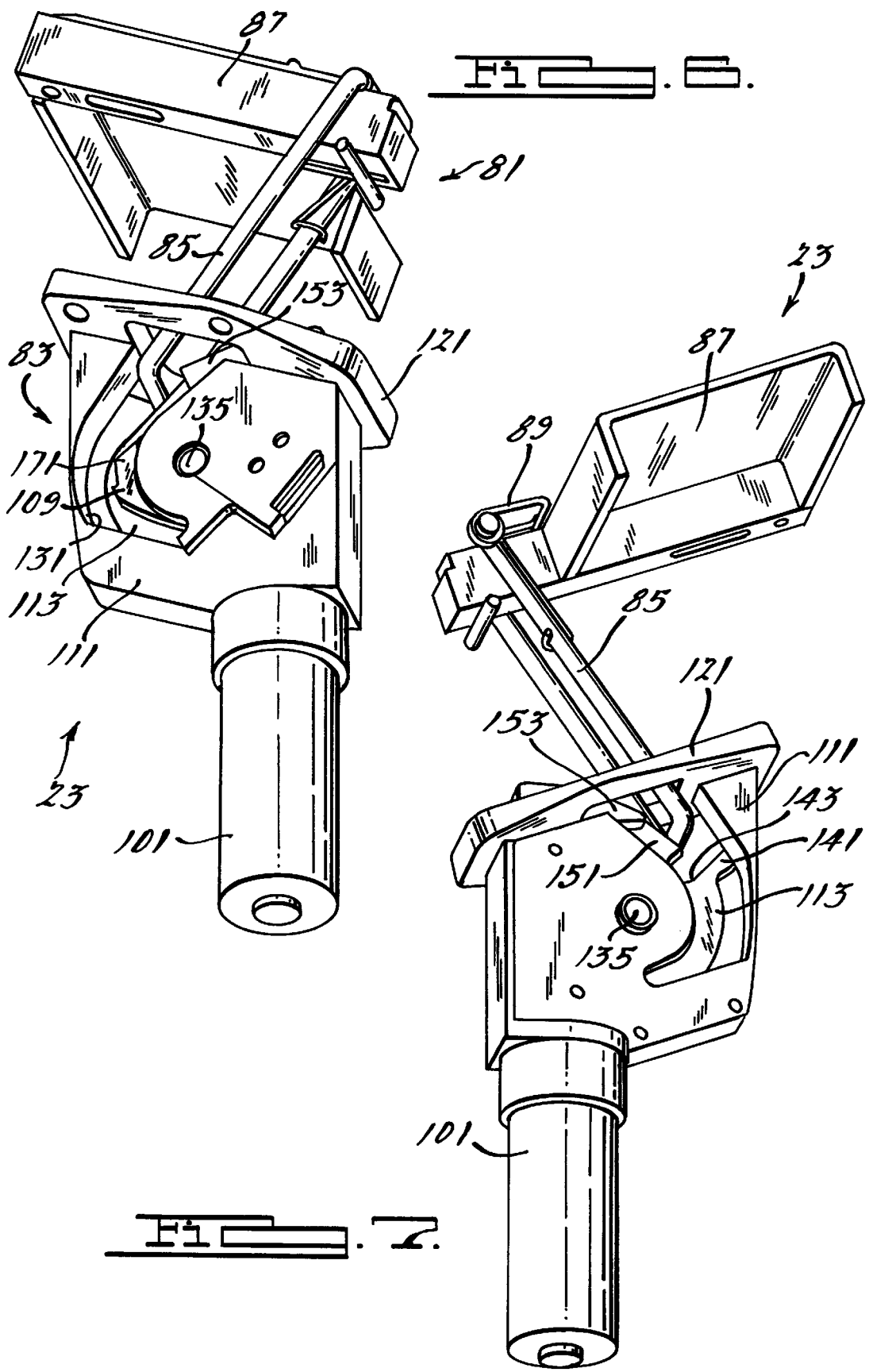

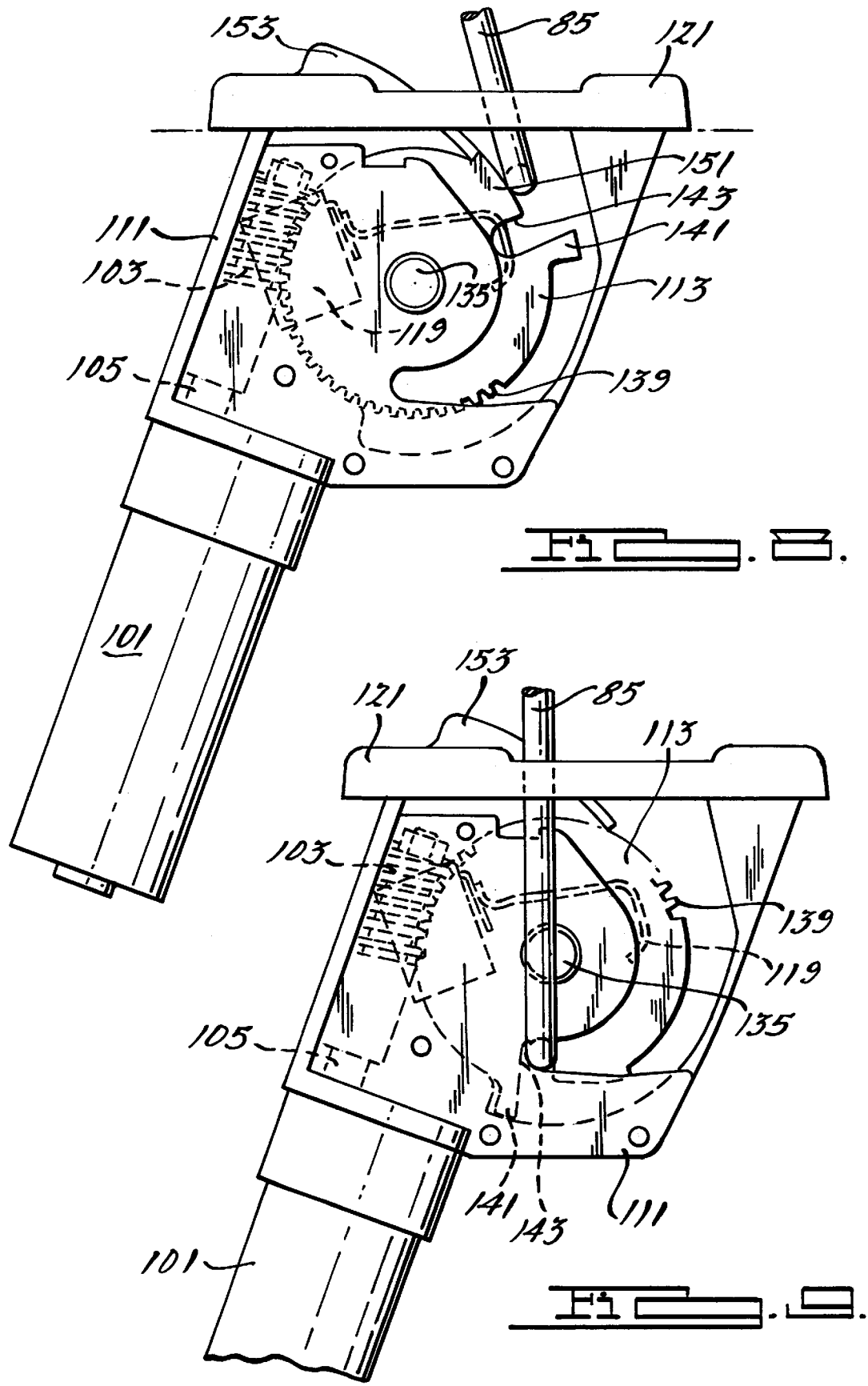

POWER LATCH FOR AN AUTOMOTIVE VEHICLE CONVERTIBLE ROOF SYSTEM

BACKGROUND AND SUMMARY OF THE INVENTION

The present invention relates generally to convertible roofs for automotive vehicles and more particularly to a power latch used with an automotive vehicle convertible roof.

It is common to employ manually operated or electrically powered latches to secure a number one roof bow of a convertible roof to a front header panel of an automotive vehicle body. Many conventional convertible roof latches employ a hook-like member which projects from beyond the front header or number one bow for engaging a striker. One such example is disclosed in U.S. Pat. No. 5,624,149, entitled "Apparatus and Method for Securing a Convertible Roof to an Automotive Vehicle" which issued to Tokarz on Apr. 29, 1997; this patent is incorporated by reference herein. Other latches are known which rotate about a moving pivot which is disposed on an opposite end of the latch from the striker engaging hook. This construction is shown in U.S. Pat. No. 5,269,586, entitled "Device for Lowering the Free End of a Vehicle Cover" which issued to Hahn et al. However, many traditional latches suffer from extremely confined packaging space. This often causes awkward and remote positioning of the power actuator relative to the latch. Furthermore, many of the striker engaging hooks are unable to maximize the mechanical advantage of the device and instead, project in an offset manner from the pivot axis and from the driving linkage connection.

In accordance with the present invention, a preferred embodiment of a power latching system is employed for securing a convertible roof to an automotive vehicle body. In another aspect of the present invention, a striker is movably mounted to either a forward or rearward portion of a convertible roof which is operably engaged by an automatically powered latch mounted to the vehicle body. A further aspect of the present invention allows for the automatically powered latch to be mounted to the convertible roof while the striker is mounted to the body. Still another aspect of the present invention employs a rotatable latch having a striker engaging slot internally projecting from a generally circular periphery wherein the latch is operably rotated by an electromagnetic device. In yet another aspect of the present invention, a rotatable latch traps a striker within an internal latch housing receptacle. Another aspect of the present invention serves to rotate the portion of the striker engaged with the latch to an over center position beyond the latch's pivot axis. A power latch of the present invention acts to secure a rearmost portion of a convertible roof against a movable tailgate of an automotive vehicle in another aspect of the present invention.

The power latch of the present invention is advantageous over traditional latches in that the present invention employs a geometrically balanced striker engaging member which efficiently uses the mechanical advantage of the system. It is also advantageous that a majority, if not all, of the latch movement occurs within a protective housing and within the vehicle body to which it is mounted; this provides an aesthetically pleasing appearance when the roof is retracted. The power latch of the present invention is ideally suited for use with a convertible roof that is downwardly collapsible against a movable tailgate or upwardly against a rear header panel; for example, the power latch can be placed in previously unused packaging space without the need for remote cables or connecting rods, and the associated expense and routing difficulties associated with such conventional constructions. Additional advantages and features of the present invention will become apparent from the following description and appended claims, taken in conjunction with the accompanying drawings.

BRIEF DESCRIPTION OF THE DRAWINGS

FIG. 1 is a fragmentary perspective view showing the preferred embodiment of an automotive vehicle convertible roof system of the present invention with front and rear convertible roofs disposed in closed and fully latched positions;

FIG. 2 is a fragmentary perspective view showing the preferred embodiment automotive vehicle convertible roof system with the convertible roofs disposed in rearward open positions;

FIG. 5 is an exploded perspective view showing the power latching system employed in the preferred embodiment automotive vehicle convertible roof system;

FIG. 6 is a perspective view, taken opposite that of FIGS. 4 and 5, showing the power latching system employed in the preferred embodiment automotive vehicle convertible roof system;

FIG. 7 is a perspective view, like that of FIG. 5, showing the power latching system employed in the preferred embodiment automotive vehicle convertible roof system;

FIG. 8 is a side elevational view, like that of FIG. 4, showing the power latching system employed in the preferred embodiment automotive vehicle convertible roof system, disposed in unlatched position; and FIG. 9 is a side elevational view, similar to that of FIG. 8, showing the power latching system employed in the preferred embodiment automotive vehicle convertible roof system, disposed in a fully latched position.

DETAILED DESCRIPTION OF THE PREFERRED EMBODIMENT

Figure 3:
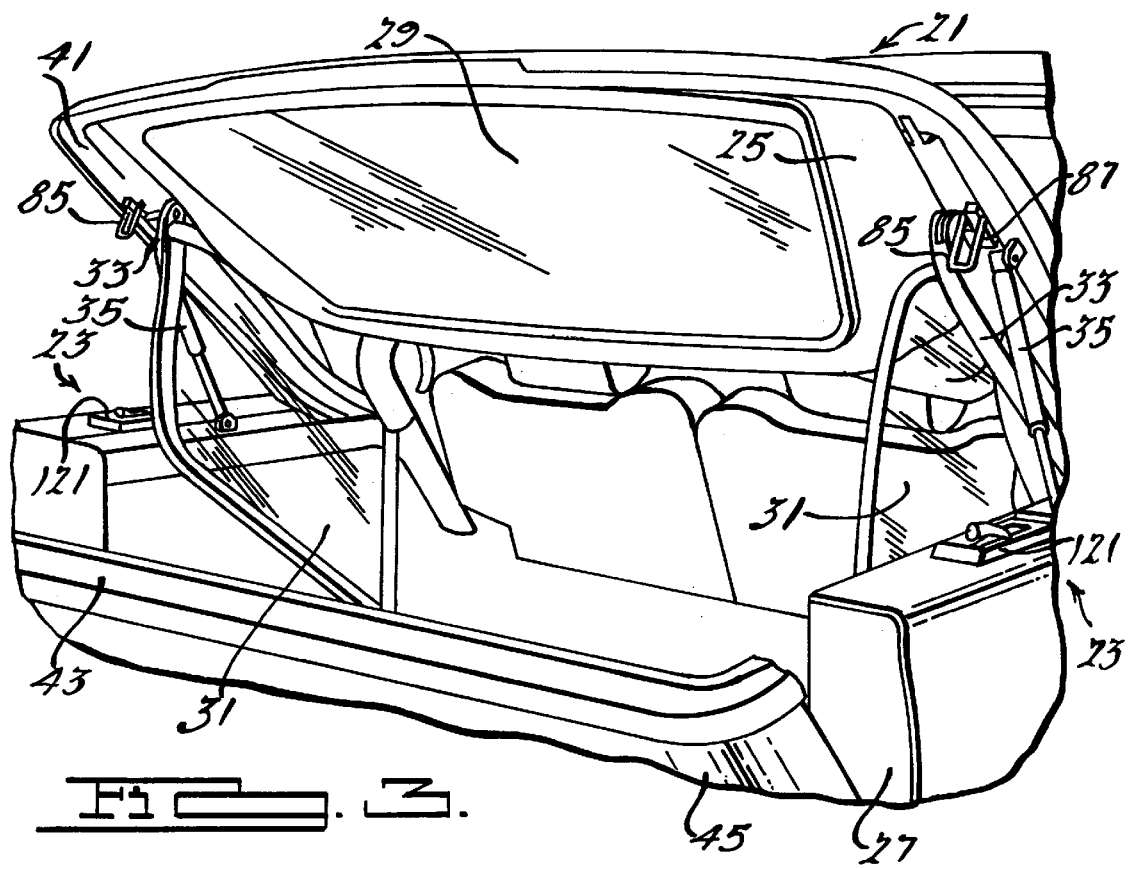
FIG. 3 is a fragmentary perspective view showing the preferred embodiment automotive vehicle convertible roof system with the rear convertible roof disposed in a partially forward open position and with a tailgate disposed in a partially open position.
Figure 4:
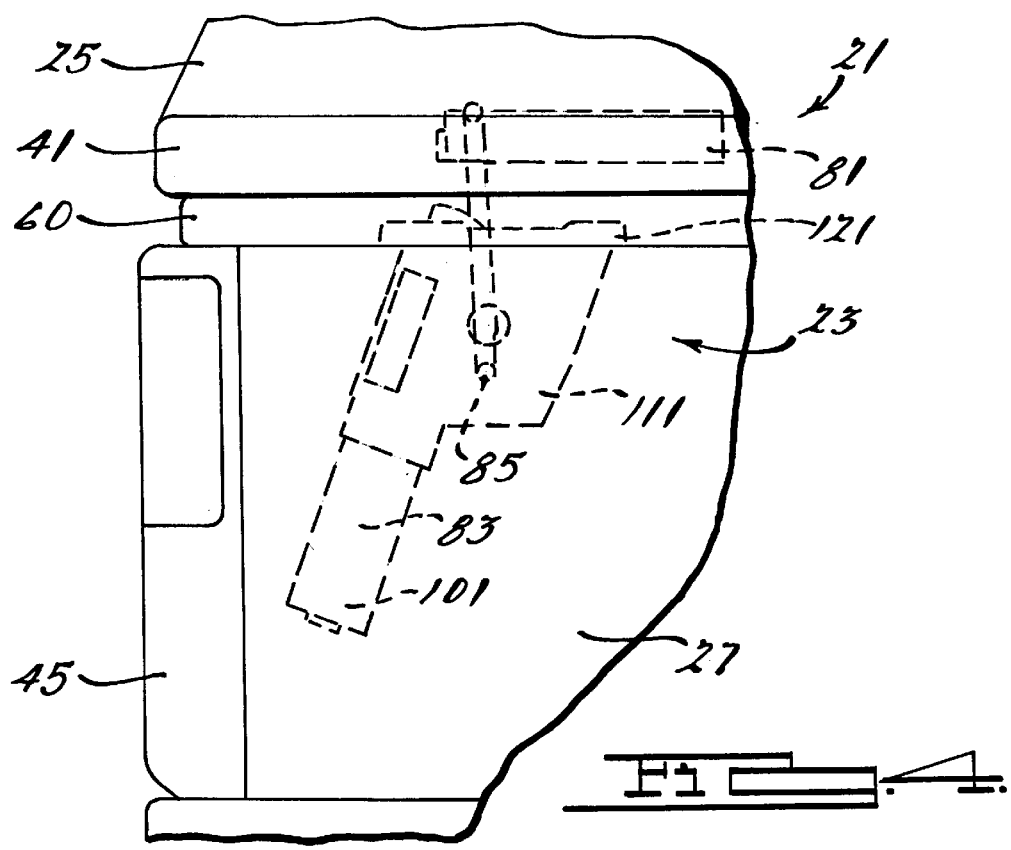
FIG. 4 is a fragmentary side elevational view showing a power latching system employed in the preferred embodiment automotive vehicle convertible roof system.
Figure 3:
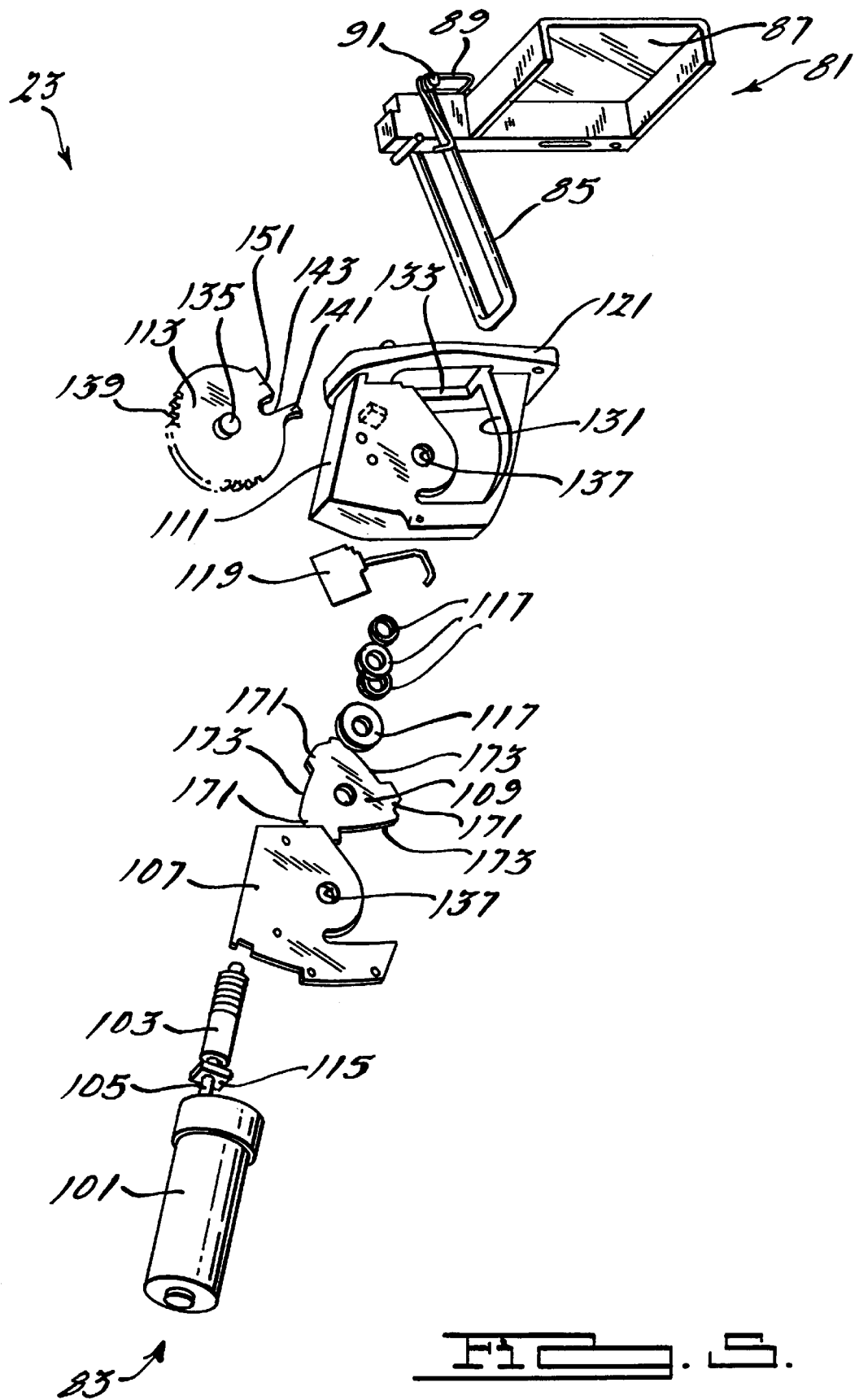

Referring to FIGS. 1–4, the preferred embodiment of an automotive vehicle convertible roof system 21 employs a plurality of power latching systems 23 to secure a rear convertible roof 25 to a body 27 of an automotive vehicle. Rear convertible roof 25 employs a fabric top spanning between a plurality of roof bows. A backlite 29 and side windows 31 are secured to the fabric top. A set of actuating balance links 33 and pneumatic cylinders 35 are used to raise and lower rear convertible roof 25 in a manual manner. Alternately, an electric motor actuator or hydraulic actuated linkage mechanism can be employed to automatically open and close rear convertible roof 25.

In the preferred embodiment, rear convertible roof 25 is rearwardly retractable from the closed position of FIG. 1 to the open position of FIG. 2. Rear convertible roof 25 may also be opened in a forward and upward manner as is shown in FIG. 3. When closed, a rearmost roof bow 41 rests against an upper edge 43 of a body panel, such as a door or tailgate 45. Rearmost roof bow 41 and the adjacent portion of rear convertible roof 25 are upwardly movable, as shown in FIG. 3, to allow access to the rear storage area of the vehicle and also to allow downward pivoting of tailgate 45. One such rear convertible roof construction is disclosed in U.S. Pat. No. 5,775,767 entitled "Convertible Top for a Vehicle having a Rear Egress" which issued to Harrison et al. on Jul. 7, 1998, and is incorporated by reference herein. A weatherstrip 60 is mounted to rearmost roof bow 41.

A front convertible roof 61 is also provided over the front passenger seating area. Front convertible roof 61 includes a fabric cover spanning between a plurality of roof bows. Front convertible roof 61 closes to a generally horizontal position as shown in FIG. 1. FIG. 2 illustrates front convertible roof 61 open by rearwardly sliding the roof bows and attached fabric in an overlapping folded manner. Power latching system 23 is preferably employed to operably secure rearmost roof bow 41 to a body portion of the vehicle adjacent tailgate 45. Alternately, however, such a power latching system can be used to secure a forwardmost roof bow 63 (see FIG. 2) to a rear header panel 65 or to secure a roof bow of front convertible roof 61 to a front header panel 67 or to rear header panel 65.

Referring to FIGS. 4–9, the preferred embodiment of each power latching system 23 includes a striker assembly 81 and a latch assembly 83. Striker assembly 81 has a U-shaped striker 85 pivotably mounted to a base 87. A torsion spring 89 is wound around a pair of transversely extending legs 91 of striker 85 and serves to bias striker 85 in an extended position with the central transverse section furthest away from base 87. This striker-to-roof bow pivoting action allows for tolerance mismatches or bow flexibility between each side of the vehicle when rear convertible roof 25 is being engaged or disengaged to body 27. Base 87 is screwed into roof bow 41.

Latch assembly 83 includes a fractional horsepower, direct current electric motor 101, a worm segment 103 of a rotating armature shaft 105, a cover plate 107, a cam plate 109, a housing 111 and a latch 113. A bearing 115 is positioned around a middle segment of armature shaft 105 for mounting to housing 111, and a plurality of annular bushings 117 are positioned between cover plate 107, cam plate 109, latch 113 and housing 111. An electric limit switch 119 is also attached to housing 111 and electrically connected to an electric control unit (not shown), such as a microprocessor, which controls energization of electric motor 101 and an automatic top stack actuation mechanism, if employed. A close-out plate 121 is preferably produced as a single part with the hidden portion of housing 111, but may alternately, be produced as a separate member. Housing 111 is screwed onto the rear quarter panels of body 27 immediately adjacent tailgate 45 (see FIG. 3). Alternately, each latch assembly 83 may be mounted within the tailgate 45 itself. Each latch assembly 83 is mechanically independent from each other whereby traditionally difficult to package interconnecting linkages and cables are not required with the preferred embodiment of the present invention. Thus, each latching assembly has its own motor 101 and latch 113.

Housing 111 has an arcuately shaped internal path 131 which defines a dead end surface. This surface is stationary relative to the corresponding portion of the vehicle body 27 (see FIG. 4). An exposed access hole 133 of plate 121 allows insertion of striker 85 into path 131.

Latch 113 is rotatable about a pivot pin 135 which rotates within pivot holes 137 of housing 111 and cover plate 107. Latch 113 has a generally circular periphery with worm gear teeth 139 outwardly projecting from the circular periphery. A finger 141 radially projects in an outward manner from the periphery of latch 113 and a striker-receiving slot 143 inwardly projects in a radial direction adjacent finger 141 and toward pivot pin 135. A tab 151 also outwardly projects from the periphery of latch 113. An arm 153 affixed to housing 111 abuts against a radial surface of tab 151 to limit rotation of latch 113 to the position shown in FIGS. 7 and 8. This defines the fully unlatched orientation.

When striker 85 is inserted through hole 133 of housing 111, striker enters path 131, abuts against finger 141 and then engages within slot 143 of latch 113. This causes depression of limit switch 119 which will energize electric motors 101 on both sides of the vehicle. Energization of each electric motor 101 causes armature shaft 105 and worm gear segment 103 to rotate. This action, in turn, drivably rotates latch 113 approximately 150 degrees to the fully latched position shown in FIG. 9, at which point the electric motor 101 is deenergized. In the fully latched position the central portion of striker 85 is trapped between an end surface of the housing path 131 and slot 143 of latch 113. It is noteworthy that pivot pin 135 is fixed, with the exception of rotation, relative to housing 111 and the adjacent vehicle body. This serves to simplify the mechanical motion and leverage of the latch in a small package space and with a smaller than normal electric motor.

Cam plate 109 assists in releasing striker 85 from latch 113 upon reverse rotation of armature shaft 105, worm gear segment 103 and latch 113 during striker unlatching. Cam plate 109 only rotates in a unidirectional manner during insertion of striker for the latching motion. Cam plate 109 rotates in 120 degree intervals when latch 113 is rotated from the unlatched position to the fully latched position. Insertion of striker 85 causes the intermittent rotation of cam plate 109 between the camming orientations. Arm 153 is mounted to housing 111 in a spring biased manner and abuts against peripheral projections 171 of cam plate 109 to prevent reverse rotation. The three peripheral camming surfaces 173 are angled to push striker 85 out of slot 143 of latch 113 when latch 113 is rotated from the fully latched position to the unlatched position. The spring biased arm 153 assists in this cam plate pushing motion.

A plurality of micro switches can also be employed to sense the relative positioning of the forwardmost rear bow of the rear convertible roof relative to the rear header and to sense the rearmost roof bow relationship to the quarter panels or tailgate. These micro switches are operable to sense the fully open, fully closed, latched and unlatched positions of the convertible roof for selective energization of the actuation mechanism by the electric control unit.

While the preferred embodiment of a power latch for an automotive vehicle convertible roof system has been disclosed, it will be appreciated that various other embodiments may be employed within the scope of the present invention. For example, the latch and electric motor can be mounted to the convertible roof bow and the striker can be mounted to the body panel. Furthermore, other latch and striker configurations can be employed although the advantages of the disclosed present invention may not necessarily be achieved. Additional gears may also be provided between the motor and the latch. While various materials and shapes have been disclosed, it will be appreciated that a variety of other materials and shapes may be employed. It is intended by the following claims to cover these and any other departures from the disclosed embodiments which fall within the true spirit of this invention.

The invention claimed is:

1. A convertible roof system for an automotive vehicle, the convertible roof system comprising:

a convertible roof movable from a covering position to a retracted position;

a mount;

a striker pivotally attached to the mount, the striker having a first elongated leg and a substantially perpendicular second leg; and a movable latch assembly operably engaging and disengaging at least one of the legs of the striker, the latch assembly including an electromagnetic device and a latch, the electromagnetic device being energizable to rotate the latch, the latch being rotatable in a first direction to engage the striker and being rotatable in a second and opposite direction to disengage the striker;

one of the latch assembly and the mount being secured to the convertible roof.

2. The convertible roof system of claim 1 wherein the striker has a substantially U-shape.

3. The convertible roof system of claim 1 wherein the latch assembly operably pulls an adjacent portion of the convertible roof toward the latch assembly between initial and full engagement of the latch assembly with the striker.

4. The convertible roof system of claim 1 further comprising a pivot axis of the latch assembly stationarily located relative to the electromagnetic device.

5. The convertible roof system of claim 1 wherein said latch assembly includes a rotatable striker engaging member having a set of gear teeth.

6. The convertible roof system of claim 5 further comprising an armature shaft having a worm gear portion directly engaging the gear teeth of the striker engaging member.

7. The convertible roof system of claim 1 further comprising a rigid rear body panel of the automotive vehicle oriented in a substantially vertical manner and having a top edge, and a portion of the convertible roof located against the top edge of the body panel when the latch assembly fully engages the striker.

8. The convertible roof system of claim 7 wherein the rear body panel is a movable door and the latch assembly is located in a rear portion of the automotive vehicle.

9. The convertible roof system of claim 1 further comprising a striker engaging portion of the latch assembly operably rotating at least 120 degrees between an initial striker engaging position and a fully engaged position.

10. A convertible roof system for use in an automotive vehicle, the convertible roof system comprising:

a convertible roof;

a striker;

a latch having a striker receiving portion, one of the striker and the latch being attached to the convertible roof;

a housing having an access hole, an access path and a stationary surface relative to the vehicle with an abutment surface, the path having a substantially arcuate section spaced away from the access hole and the path ending at the abutment surface;

a pivot axis stationarily oriented relative to the housing, the latch operably rotating around the pivot axis, the striker being insertable into the housing when in a fully latched position; and an automatically powered actuator operable to rotate the latch for engaging the striker;

the latch serving to trap an engaged portion of the striker between the striker receiving portion of the latch and the stationary surface on the housing when the striker is in the fully latched position.

11. The convertible roof system of claim 10 wherein the latch has a periphery with a substantially circular shape, the pivot axis of the latch is coaxial with the periphery, and the striker receiving portion of the latch is a slot inwardly extending from the periphery of the latch substantially toward the pivot axis.

12. The convertible roof system of claim 10 wherein the arcuately shaped path of the housing ends at the stationary surface of the housing, the path inwardly extends from the access hole at an outer edge of the housing, and the engaged section of the striker is trapped between innermost portions of a slot in the latch and the stationary surface of the housing when in the fully latched position.

13. The convertible roof system of claim 11 wherein the latch is a gear having gear teeth.

14. The convertible roof system of claim 10 further comprising a rigid rear body panel of the automotive vehicle oriented in a substantially vertical manner and having a top edge, and a portion of the convertible roof located against the top edge of the body panel when the latch fully engages the striker.

15. The convertible roof system of claim 14 wherein the rear body panel is a movable door and the latch is located in a rear portion of the automotive vehicle.

16. The convertible roof system of claim 10 wherein the actuator is an electromagnetic device energizable to rotate the latch, the latch is rotatable in a first direction to engage the striker and is rotatable in a second and opposite direction to disengage the striker.

17. The convertible roof system of claim 10 wherein the latch operably pulls an adjacent portion of the convertible roof toward the actuator between initial and full engagement of the latch with the striker.

18. An automotive vehicle comprising:

an automotive vehicle body having a movable tailgate;

a convertible roof having a roof bow movable from a first position to a second position, the first position being located adjacent the tailgate and the second position being spaced away from the tailgate; and an automatically powered latch assembly operable to secure the convertible roof in the first position, the latch assembly being located adjacent the tailgate, the latch assembly including a housing having an access hole and an arcuately curved access path defining a concave shape, the latch assembly further including a rotatable member having a striker-receiving slot, the slot and the access path operably overlapping.

19. The automotive vehicle of claim 18 wherein the latch assembly includes:

an electromagnetic device; and a latch operably rotatable by the electromagnetic device.

20. The automotive vehicle of claim 19 further comprising:

a peripheral edge of the latch having an inwardly extending slot; and a striker operably engagable by the slot.

21. The automotive vehicle of claim 20 wherein the striker is mounted to and pivotable relative to the convertible roof, and the electromagnetic device is stationarily mounted to the body.

22. The automotive vehicle of claim 19 further comprising a set of gear teeth located on the latch.

23. The automotive vehicle of claim 18 wherein the latch assembly includes a first latch driven by a first actuator and a second latch driven by a second actuator, the latches being located adjacent the tailgate.

24. A convertible roof system for use in an automotive vehicle, the convertible roof system comprising:

a first roof latching system having a first latch, a first actuator and an electric switch, the first actuator operably driving the latch; and a second roof latching system having a second latch and a second actuator, the second actuator operably driving the second latch, the latching systems being mechanically independent and spaced from each other;

latching of the first latching system causing a change in condition of the switch which, in turn, causes energization of the first and second actuators.

25. The convertible roof system of claim 24 further comprising:

a convertible roof;

a first striker projecting from the convertible roof; and a second striker projecting from the convertible roof, the strikers being spaced from each other in a crosscar manner;

contact of the first striker against the switch causing the change in condition of the switch.

26. The convertible roof system of claim 24 wherein the first latch is rotatable and has a periphery with a substantially circular shape, a slot internally extends from the periphery of the first latch, and gear teeth are located on the first latch for engagement with the first actuator.

27. The convertible roof system of claim 1 further comprising a spring biasing the striker relative to the mount.

* * * * *